US009985897B2

(12) United States Patent
Stapleton et al.

(10) Patent No.: US 9,985,897 B2
(45) Date of Patent: May 29, 2018

(54) INTEGRATED CIRCUIT RADIO DEVICES (71) Applicant: Nordic Semiconductor ASA, Trondheim (NO)

(72) Inventors: Joel David Stapleton, Trondheim (NO); Øyvind Hovdsveen, Trondheim (NO); Hans Elfberg, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 182 days.

(21) Appl. No.: 15/038,870

(22) PCT Filed: Nov. 12, 2014

(86) PCT No.: PCT/GB2014/053350
§ 371 (c)(1),
(2) Date: May 24, 2016

(87) PCT Pub. No.: WO2015/079204
PCT Pub. Date: Jun. 4, 2015

(65) Prior Publication Data
US 2017/0005941 A1    Jan. 5, 2017

(30) Foreign Application Priority Data

Nov. 27, 2013   (GB) .................................. 1320912.7

(51) Int. Cl.
*H04L 12/859*    (2013.01)
*H04W 72/04*    (2009.01)
(Continued)

(52) U.S. Cl.
CPC ..... *H04L 47/2475* (2013.01); *H04W 72/0446* (2013.01); *H04W 72/1263* (2013.01); *H04W 88/06* (2013.01)

(58) Field of Classification Search
CPC .......... H04L 47/2475; H04W 72/0446; H04W 72/1263; H04W 88/06
See application file for complete search history.

(56) References Cited

U.S. PATENT DOCUMENTS 6,931,647 B1   8/2005  Firth et al.
7,315,904 B2   1/2008  Geib et al.
(Continued)

FOREIGN PATENT DOCUMENTS

EP          1729463 A1    12/2006
EP          1760958 A2     3/2007
WO      WO2012/168030 A1  12/2012

OTHER PUBLICATIONS

Search Report under Section 17(5) for GB1320912.7, dated Mar. 28, 2014, 4 pages.
(Continued)

*Primary Examiner* — Asad Nawaz
*Assistant Examiner* — Saad A Waqas
(74) *Attorney, Agent, or Firm* — Klarquist Sparkman, LLP (57) ABSTRACT

Disclosed is a semiconductor device 2 comprising a radio transmitter hardware section 10 and a processor 4, the device 2 being arranged to transmit information via said transmitter hardware section 10 from a first application running on the processor 4 in accordance with a first communication protocol or from a second application running on the processor 4 or a further processor using a second communication protocol, wherein the first application is configured to generate a first transmit request 24 when it requires to send a data packet and wherein the second application is configured to generate a second transmit request 34 when the second application requires to send a data packet, the device further comprising control logic 22 for allocating a transmission timeslot for said transmitter section 10 to said first or second (Continued)

application upon receipt of said first 24 or second 34 transmit requests respectively.

16 Claims, 8 Drawing Sheets

(51) Int. Cl.
  *H04W 72/12* (2009.01)
  *H04W 88/06* (2009.01)

(56) References Cited

U.S. PATENT DOCUMENTS

| | | | |
|---|---|---|---|
| 8,107,427 | B1 | 1/2012 | Husted et al. |
| 8,150,923 | B2 | 4/2012 | Vaschillo et al. |
| 2001/0030975 | A1* | 10/2001 | Limb ................. H04L 12/2801 |
| | | | 370/465 |
| 2002/0167961 | A1* | 11/2002 | Haartsen ............... H04W 72/10 |
| | | | 370/444 |
| 2003/0231741 | A1 | 12/2003 | Rancu et al. |
| 2008/0229319 | A1 | 9/2008 | Marchand |
| 2008/0287158 | A1 | 11/2008 | Rayzman et al. |
| 2008/0318630 | A1 | 12/2008 | Gil |
| 2009/0063740 | A1 | 3/2009 | Yeh et al. |
| 2009/0156129 | A1* | 6/2009 | Hassan ................. G06F 9/5044 |
| | | | 455/66.1 |
| 2009/0180451 | A1* | 7/2009 | Alpert ............... H04W 72/1215 |
| | | | 370/338 |
| 2012/0309401 | A1 | 12/2012 | Orjmark et al. |
| 2014/0233444 | A1* | 8/2014 | Wang ................ H04W 72/1242 |
| | | | 370/311 |

OTHER PUBLICATIONS

International Search Report and Written Opinion for PCT/GB2014/053350, dated Mar. 4, 2015, 8 pages.

International Preliminary Report on Patentability for PCT/GB2014/05350, dated Jun. 9, 2016, 6 pages.

* cited by examiner

INTEGRATED CIRCUIT RADIO DEVICES

CROSS REFERENCE TO RELATED APPLICATIONS

This is the U.S. National Stage of International Application No. PCT/GB2014/053350, filed Nov. 12, 2014, which was published in English under PCT Article 21(2), which in turn claims the benefit of Great Britain Application No. 1320912.7, filed Nov. 27, 2013. Both applications are incorporated herein in their entirety.

This invention relates to integrated-circuit radio-communication devices and methods of configuring such devices.

Integrated-circuit radio-communication devices typically integrate a processor, memory and radio communication logic on a silicon chip. An antenna may be fabricated on the silicon or may be connected externally. The device will have pins for connecting to a power supply, clock source and any external peripherals such as sensors, timers, digital-to-analog converters and output devices. The processor interfaces with the radio communication logic in order to supervise the sending and/or receiving of radio messages.

Such radio-communication devices, or chips, can be used in a wide range of wireless products, such as wireless mice and keyboards, controllers for game consoles, bicycle speedometers, remote controls, garage-door openers, wireless loudspeakers, etc.

The processor on such a device may run software directly from non-volatile memory in order to control the radio communication logic according to a predetermined radio protocol, such as Bluetooth, Bluetooth Low Energy® or ZigBee®.

The manufacturing of a complete product, such as a wireless mouse, that incorporates such a radio-communication chip typically involves the manufacturer of the radio chip supplying it to a product manufacturer, who will integrate the chip into the rest of the product. The chip manufacturer may also provide a development kit, containing tools, such as a cross compiler, loader and debugger, and documentation that allow the product manufacturer to develop, install and debug custom application software for the radio device. The custom application software may, for instance, include routines for receiving input from a movement sensor on a wireless mouse and for transmitting suitable radio messages according to a desired protocol.

A development kit may additionally include source code for a software library and/or operating system, written by the chip manufacturer. The product manufacturer can then compile and link the supplied source code with its own custom software application, to create a single object file for loading to a predetermined address in the memory of each chip.

The library or operating system may contain instructions that implement a particular radio protocol. It could include other functions, such as memory management, processor scheduling, inter-process communication, etc. The application developer can call these supplied functions from its application code, rather than having to write them from scratch. This can make development of the application software simpler and quicker. It can also ease portability between different models of the radio chip.

In some cases there is a need for a device to be able to operate using different radio protocols. For example a single device may need to support communication using both WiFi (IEEE 802.11) and Bluetooth® or both Bluetooth® and a proprietary radio protocol.

US 2008/0287158 A1 provides a method for sharing a communication medium between multiple communication protocols with independent transmission/reception hardware using a shared antenna with a hardware arbitration apparatus. Similarly, EP 1729463 A1 provides a method for sharing an antenna between multiple communication protocols.

Thus it is known in the art to have completely separate radio infrastructure dedicated to each protocol but this is expensive in terms of resources and could also lead to interference between the two types of radio communication.

It is therefore more practical to share the antenna and other transmission/reception resources. Typically this is done by writing libraries and source code which coordinate the operation of the two protocols using an in-depth knowledge of the real-time requirements and inter-frame timing of each. Such a combined protocol stack may be a viable option where the two protocols are standard ones. Although such a stack is more complex to use and will often require requalification to add features, it can be provided and properly tested by a chip manufacturer. However when it is desired to include a proprietary protocol with a standard one, the developer implementing the code needs to have a thorough knowledge of both protocols and there is the risk of errors arising from the increased complexity which can cause problems with one or both of them.

The present invention aims to address this issue and when viewed from a first aspect provides a semiconductor device comprising a radio transmitter hardware section and a processor, the device being arranged to transmit information via said transmitter hardware section from a first application running on the processor in accordance with a first communication protocol or from a second application running on the processor or a further processor using a second communication protocol, wherein the first application is configured to generate a first transmit request when it requires to send a data packet and wherein the second application is configured to generate a second transmit request when the second application requires to send a data packet, the device further comprising control logic for allocating a transmission timeslot for said transmitter section to said first or second application upon receipt of said first or second transmit requests respectively, the device further comprising an application programming interface which permits the second protocol to be defined.

When viewed from a second aspect the invention provides a semiconductor device comprising a radio receiver hardware section and a processor, the device being arranged to receive information via said receiver hardware section to a first application running on the processor in accordance with a first communication protocol or to a second application running on the processor or a further processor using a second communication protocol, wherein the first application is configured to generate a first receive request when it requires to receive a data packet and wherein the second application is configured to generate a second receive request when the second application requires to receive a data packet, the device further comprising control logic for allocating a reception timeslot for said receiver section to said first or second application upon receipt of said first or second receive requests respectively, the control logic being arranged in the event of receiving conflicting first and second receive requests to allocate said reception timeslot based on said first and second protocol priority level indicators.

Thus it will be seen by those skilled in the art that in accordance with the invention two radio protocols can share radio hardware resources without each having a detailed knowledge of the other as would be required if their operation were fully coordinated. This allows the protocols to be implemented independently of one another, in separate stacks, which in turn allows a standard protocol to be supplied, pre-qualified, in a stack by a chip vendor without any compile-time or link-time dependencies with the other protocol implemented on the device. The other protocol, e.g. a proprietary protocol, can be written by a developer without needing to consider the behaviour of the protocol supplied by the vendor, which simplifies implementation and any errors in the proprietary protocol will not have a detrimental impact on the vendor-supplied protocol. Advantageously, this prevents the need for duplication of resources in order for an apparatus to have a particular function at the time of fabrication. This also advantageously makes spare resources available to a post-fabrication protocol without hindering the performance or operation of the pre-qualified protocol. These spare resources are then available in a safe, controlled manner for uses that are not known at the time of fabrication.

In a set of embodiments said first protocol is implemented by a pre-compiled protocol stack.

In a set of embodiments the device comprises a memory having a firmware module stored at a firmware memory address, the firmware module comprising instructions forming part of the first application, wherein the processor is configured to receive supervisor call instructions, each having an associated supervisor call number, and to respond to a supervisor call instruction by (i) invoking a supervisor call handler in the firmware module, and (ii) making the supervisor call number available to the call handler.

The first application may be loaded into the memory of the device such that the first application is stored at a predetermined application memory address. The first application may be arranged to invoke a radio communication function from the firmware module by issuing a supervisor call instruction having an associated predetermined supervisor call number corresponding to the function to be invoked.

In a set of embodiments the first and/or second request further comprises a session identification field. This allows either application to maintain multiple concurrent sessions under its associated protocol. This might be used for example to provide one session which allows the device to communicate with a mobile device such as a phone using a protocol such as Bluetooth and to communicate with another device using the same protocol, e.g. Bluetooth.

The device of the first aspect of the invention could be arranged such that the control logic allocates said timeslots according to an order in which it receives said transmit requests. In a set of embodiments however said first transmit request comprises a first protocol priority level indicator, said second transmit request, comprises a second protocol priority level indicator and the control logic is arranged in the event of receiving conflicting first and second transmit requests to allocate said transmission timeslot based on said first and second protocol priority level indicators.

Similarly the device of the second aspect of the invention could be arranged such that the control logic allocates said timeslots according to an order in which it receives said receive requests. In a set of embodiments however said first receive request comprises a first protocol priority level indicator, said second receive request comprises a second protocol priority level indicator and the control logic is arranged in the event of receiving conflicting first and second receive requests to allocate said reception timeslot based on said first and second protocol priority level indicators.

Thus where, in accordance with these embodiments of the invention, the control logic receives conflicting first and second requests, it will allocate a timeslot according to the respective priority level indicators. The enables protocols with real-time procedures to have more control over completion of critical operations or sequences. In a set of embodiments the control logic is arranged to issue a signal to the application which issued the request with the lower level priority indicator that the request has been denied, The application may then (according to a predetermined algorithm) issue a further request. This could be a request for the same timeslot but with a higher priority level or a request for a later timeslot.

As well as issuing a transmit or receive request, the first or second application may also be able to issue a request to access the radio module in order to prevent it from transmitting or receiving. This can be useful for example where it is necessary to limit a maximum power level for the device.

Although reference has been made herein to first and second radio protocols this is not intended to be limiting and additional radio protocols may be supported. This could be in the form of additional vendor-supplied (e.g. pre-compiled) protocol stacks or additional user-defined protocol stacks.

The first and second applications may have the same set of priority levels available to them. In an alternative set of embodiments however the first application has at least some higher priority levels available to it than the second protocol. This makes it possible to ensure that a vendor-supplied protocol is not excessively disrupted by a user-defined protocol.

In a set of embodiments the first and/or second applications receive timing information from the control logic.

When viewed from a further broader aspect, the invention provides a semiconductor device comprising a radio transmitter hardware section and a processor, the device being arranged to transmit information via said transmitter hardware section from a first application running on the processor in accordance with a first communication protocol or from a second application running on the processor or a further processor using a second communication protocol, wherein the first application is configured to generate a first transmit request when it requires to send a data packet and wherein the second application is configured to generate a second transmit request when the second application requires to send a data packet, the device further comprising control logic for allocating a transmission timeslot for said transmitter section to said first or second application upon receipt of said first or second transmit requests respectively.

In a preferred set of embodiments, the device comprises an application programming interface configured to receive the second communication protocol.

A particular embodiment of the invention will now be described, by way of example only, with reference to the accompanying drawings in which.

Figure 1:
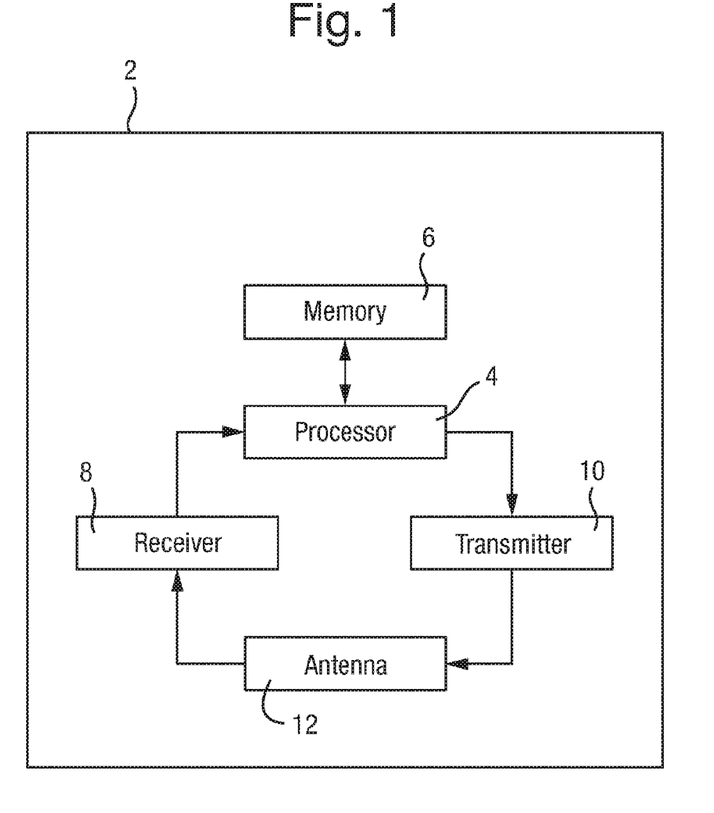
FIG. 1 is a simplified system block diagram of a device in accordance with the invention.

Turning first to FIG. 1 there may be seen a schematic representation of the physical parts of a radio-enabled microprocessor device 2. This could be provided as an integrated semiconductor component commonly known as a 'System on Chip' or 'SoC' arrangement. The device 2 could be incorporated into any of a large variety of different applications—either fixed or mobile—and may be configured to transmit, receive or both.

At the heart of the device 2 is a processor 4 which communicates with a memory 6. The processor 4 also communicates with a radio receiver 8 and radio transmitter 10 which share a common antenna 12 and which allow radio signals to be received and transmitted by the device, The general design and operation of an SoC device are well known to those skilled in the art and thus further details are not necessary here.

Figure 2:
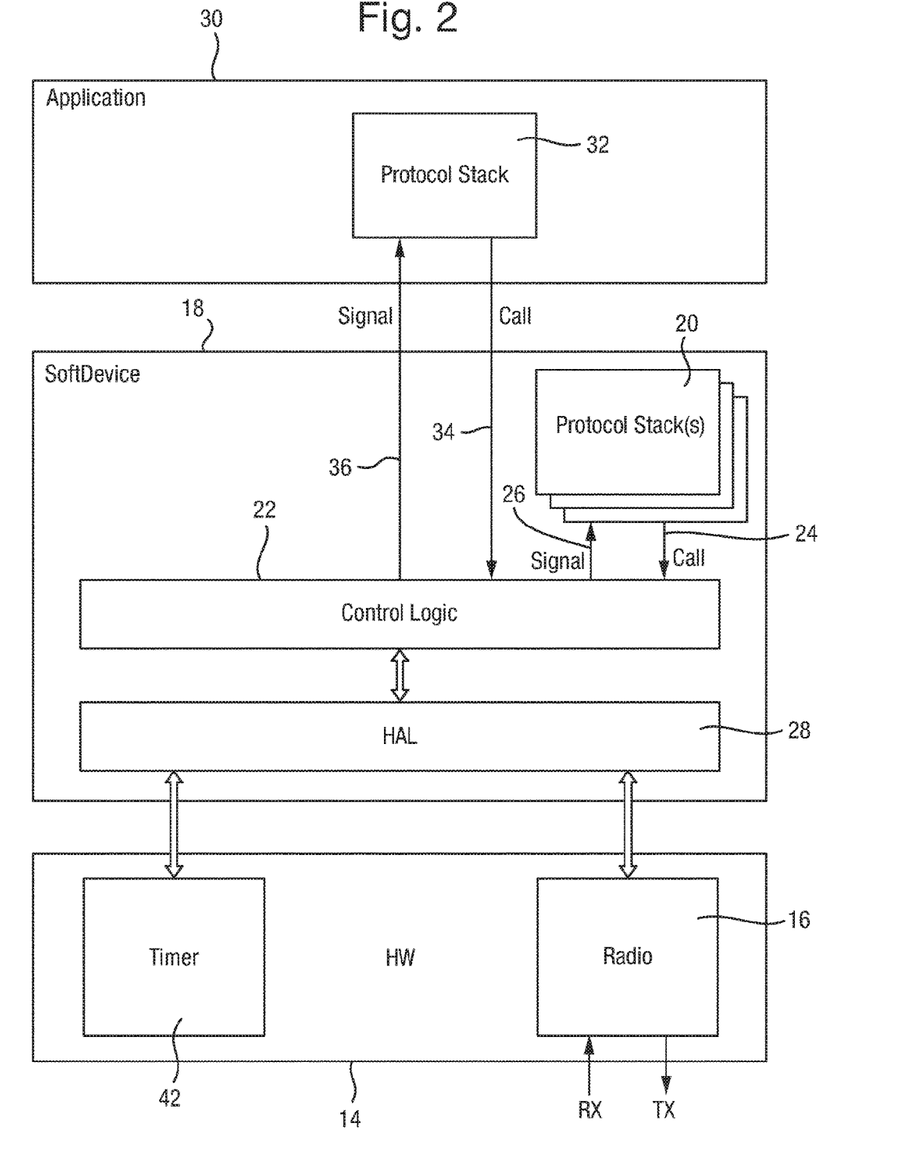
FIG. 2 is a simplified module block diagram of the device described with reference to FIG. 1.

FIG. 2 shows the main functional modules of the device 2. At the lower part of the diagram is the hardware layer 14. This contains, among other things, the radio section 16 which includes the antenna 12 and amplifiers, analogue filters etc. which make up the transmitter 10 and receiver 8 and which are well known per se in the art. In this example the radio section 16 is capable of both transmission (TX) and reception (RX). It also contains a hardware timer 42.

Above the hardware section 14 is a software implementation referred to herein as the SoftDevice 18. This is effectively firmware which is resident in a particular, protected part of the device's memory 6—namely the firmware memory address. It comprises a first protocol stack 20 which has instructions forming a first application implementing a first radio protocol such as Bluetooth Low Energy™.

The first protocol stack 20 is able to communicate with control logic 22 through requests 24 and returned signals 26. The control logic 22 interfaces with a hardware access layer 28 which controls the operation of the radio hardware section 16 and communicates with the timer 42.

The functions of the firmware module comprising the first protocol stack 20 can be accessed by the processor 4 using service calls. Thus the processor receives supervisor call instructions, each having an associated supervisor call number, and responds to supervisor call instructions by (i) invoking a supervisor call handler in the firmware module, and (ii) making the supervisor call number available to the call handler.

In addition to the SoftDevice 18 described above, the device also includes a further, unprotected area of application memory 30. This includes a second protocol stack 32 which comprises a second protocol stack 32 which has instructions forming a second application implementing a second radio protocol such as a proprietary radio protocol developed by a customer purchasing the device 2 for incorporation into a product. The second protocol stack 32 is also able to communicate with the control logic 22 through corresponding requests 34 and returned signals 36. The processor 4 can access the application memory area 30 directly and so does not need to employ supervisor call instructions.

As will become further apparent hereinbelow, the arrangement of the device is such that the first protocol stack 20 and the second protocol stack 32 are completely independent of one another yet can easily share the radio resources 6. In particular it will be seen that this can be achieved without the second protocol stack 32, which may be written not by the device manufacturer but by a third party developer, needing to know or take account of the detailed operation and timings of the first, 'built-in' protocol stack 20.

Figure 3A:
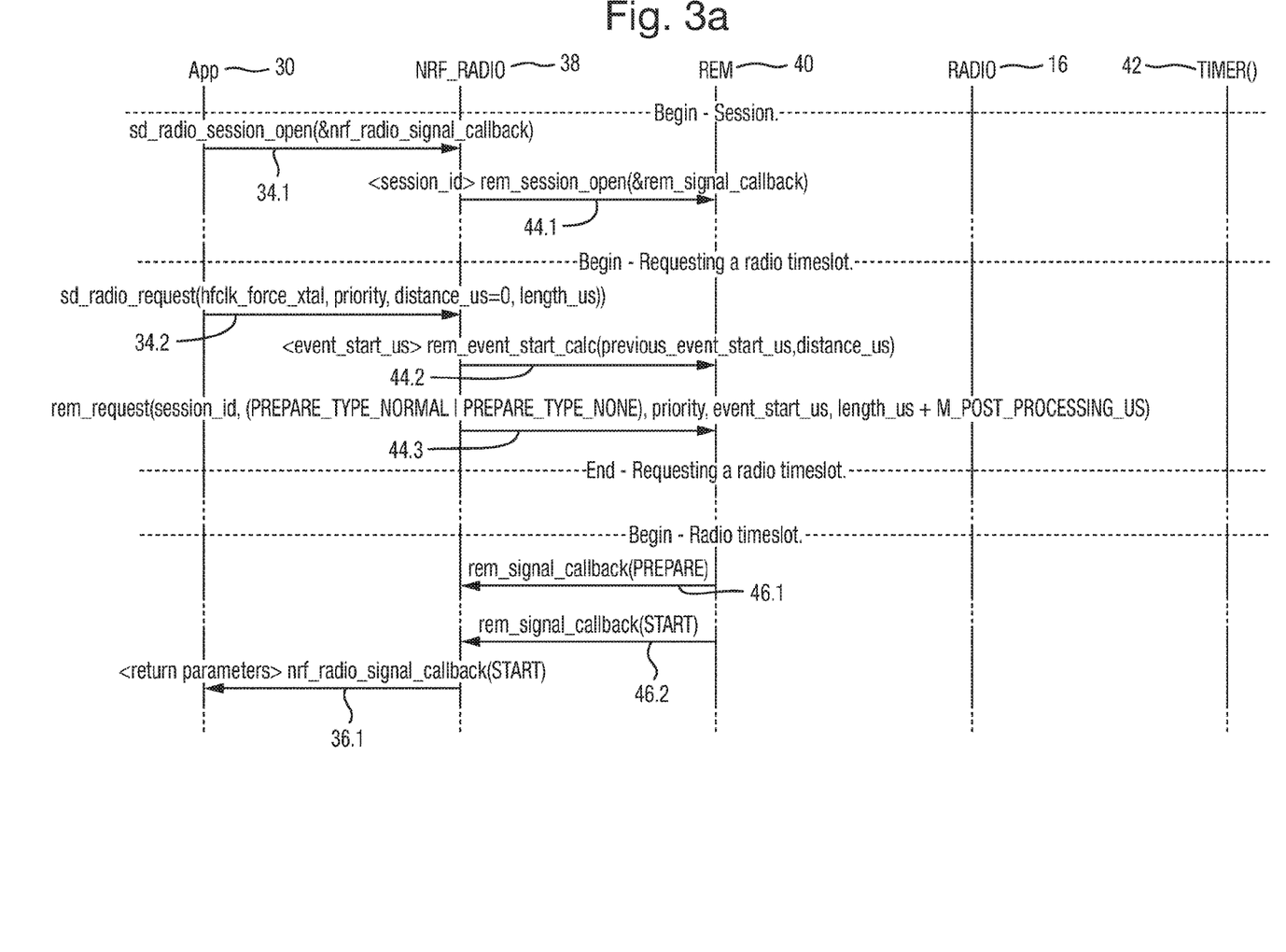
FIG. 3 is a timing diagram illustrating an operation of the embodiment.
Figure 3B:
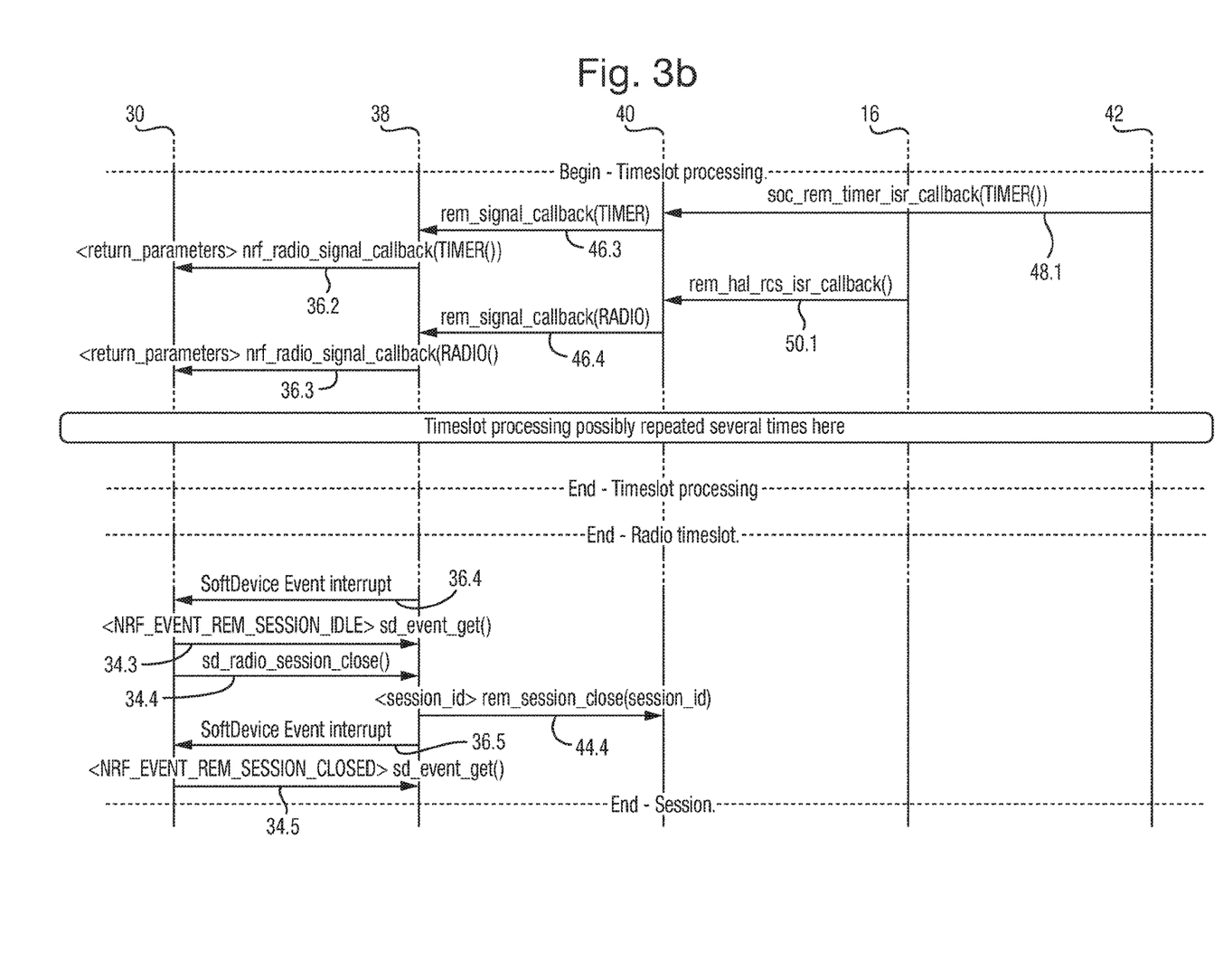

FIGS. 3a and 3b show operation of the embodiment which is described with reference to FIGS. 1 and 2. It may be seen that the diagram includes five vertical lines which represent different respective parts of the system as will be described. The first vertical line represents the software application 30 which includes the second protocol stack 32 for implementing the developer's proprietary radio protocol. The second vertical line 38 represents an application programming interface (API) which is offered to the application 30 by the SoftDevice 18. This forms part of the control logic 22 shown in FIG. 2. The third vertical line 40 represents the Radio Event Manager (REM) which comprises part of the Hardware Access Layer 28 (see FIG. 2). The fourth vertical line represents the radio hardware 16 and the fifth line represents the hardware timer 42.

The operation which will be described here commences with a call 34.1 from the application 30 to the API 38 to open a session. The API 38 then passes on a corresponding call 44.1 to the REM 40. Subsequently, the API 38 sends a call to the REM 40 to open a session in the REM.

Sometime after the session is opened, the application 30 makes a further request 34.2 for access to the radio resources for a period of time. The request includes an indication of how far in the future the access will be required, for how long access is required and also a priority level determined by the protocol stack 32 for that particular request. Again, the API 38 passes on a corresponding call 44.2 to the REM 40 to calculate the radio timeslot start which is then followed by a second call 44.3 to request the radio timeslot. This ends the sequence by which the application 30 requests a radio timeslot.

At the time specified in the radio request, the REM 40 issues a signal 46.1 indicating that the API 38 should prepare to receive a call-back and a second signal 46.2 which is the call-back itself. The call-back 46.2 represents an indication from the REM 40 that the application 30 is being granted the radio timeslot that it requested—i.e. that it now has access to the radio. The API 38 therefore passes on a call-back 36.1 to the application 30 so that it may begin using the radio 16. When the application 30 receives the call-back 36.1 it restarts an internal timer so that its timer is referenced to the last requested radio timeslot. This means that when it requests the next radio timeslot the request is made relative to the last radio timeslot that the application requested. This allows the application 30 to operate without access to the clock on which the SoftDevice 18 is running which facilitates their functional separation.

Operation of the embodiment will be further described with reference to FIG. 3b. The top half of FIG. 3b shows operation while the application has access to the radio 16. The first signal shown is conveyed by a signal call-back 48.1 from the hardware timer 42 to the REM 40. This is then propagated back to the application 30 by a call-back signal 46.3 from the REM 40 to the API 38 and a subsequent call-back signal 36.2 from the API 38 to the application 30. Similarly, a signal generated by the radio 16 can be propagated via call-back signals 50.1, 46.4 and 36.3. This mechanism allows the application 30 to have access to a high accuracy, high frequency timer from within a timeslot. These events also allow the application to get all the information it requires about the radio state and gives the application access to the resources it needs to exploit the complete radio feature set while it has the event. There may of course be several signals conveyed by the signal call-back during a particular radio timeslot.

The lower part of FIG. 3b illustrates the procedure for ending the application's access to the radio timeslot. This begins with a SoftDevice event interrupt in the form of a signal 36.4 from the API 38 to the application 30 which indicates to the application that an event has been generated.

The application 30 then issues a call 34.3 in reply to establish what the SoftDevice event was. This is a generic mechanism by which a SoftDevice event is provided to the application 30. At a later time, a further call 34.4 from the application 30 is sent to the API 38 indicating that the application has finished using the radio. This is propagated in a further call 44.4 to the REM 40 to close the session. The API 38 then sends an interrupt signal 36.5 to indicate the SoftDevice event generated due to the closed session. This is acknowledged by the call 34.5 from the Application 30 to the API 38.

It can be seen that in accordance with the procedure described above, the application 30 can request and be granted access to the radio resources by means of the API 38.

Figure 4:
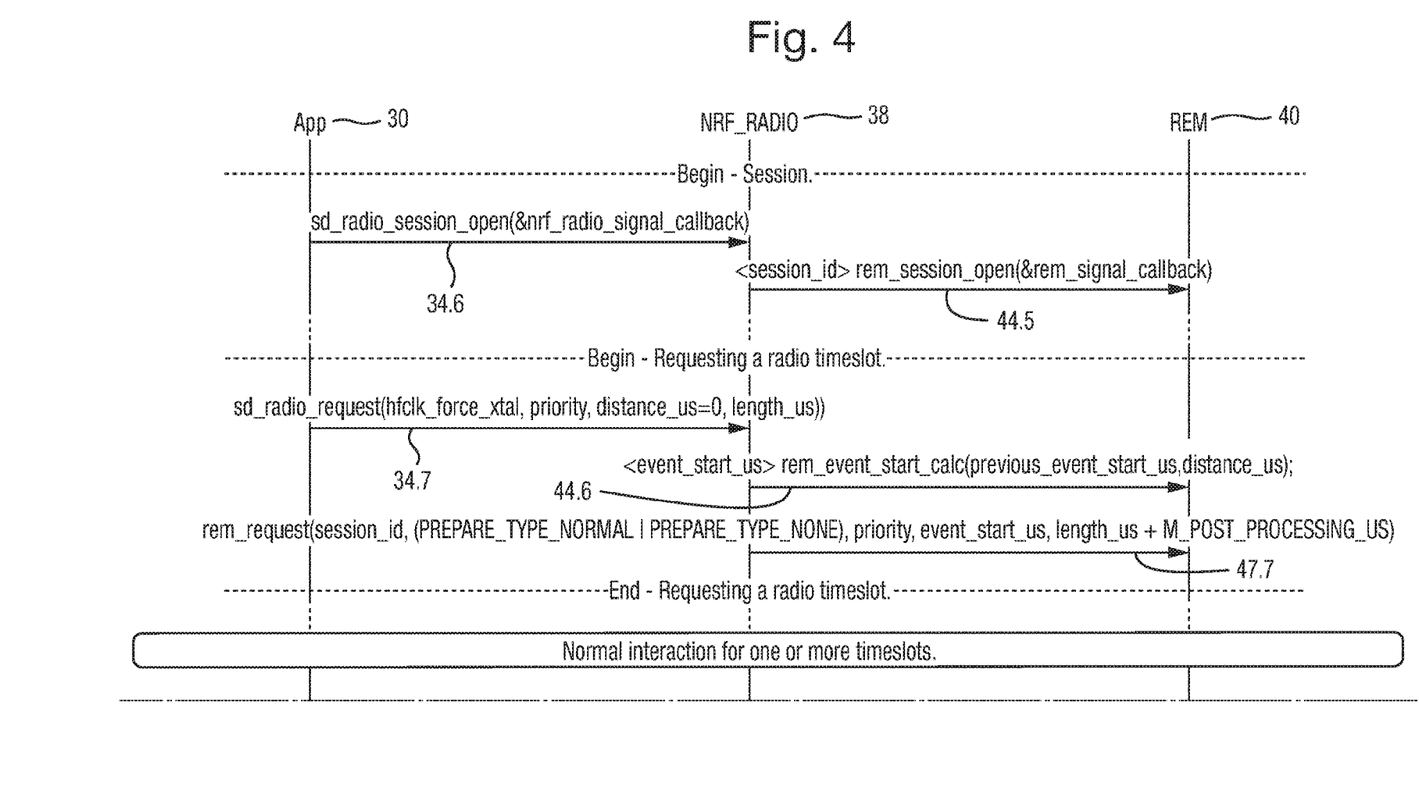
FIG. 4 is a timing diagram illustrating a modified operation of the embodiment.

FIG. 4 shows further an operation of the device when a request for radio resources is not granted to the application e.g. because it conflicts with another request from the built-in radio protocol. In this diagram, only the application 30, API 38 and Radio Event Manager 40 are shown in order to improve clarity.

At the beginning of the procedure the application 30 sends a call 34.6 to open a session which is propagated to the REM 40 by a further call 44.5. This part of the operation is identical to that described with reference to FIG. 3a. Again, just as in FIG. 3a, a request 34.7 from the application 30 to the API 38 is sent, which is propagated as call 44.6 and 44.7 from the API 38 to the REM 40.

Sometime later, a signal 46.5 is sent from the REM 40 to the API 38 to indicate that the request for a radio timeslot has been denied or blocked. This generates a SoftDevice event in the API 38 which is communicated to the application 30 by the standard pair of signal 36.6 and call 34.8.

Thereafter, the application 30 makes a further request for a radio timeslot 34.9. This request could be for a different timeslot or could be for the same timeslot as the previous request but with a higher priority. As before, the request is propagated by the API 38 to the REM 40 by means of call 44.7 and 44.8. Although not shown, this then results in a timeslot being granted and the procedure is then as described with reference to FIG. 3b above. The procedure 52 for closing the session is then followed which is the same as was described with reference to FIG. 3b.

Figure 5:
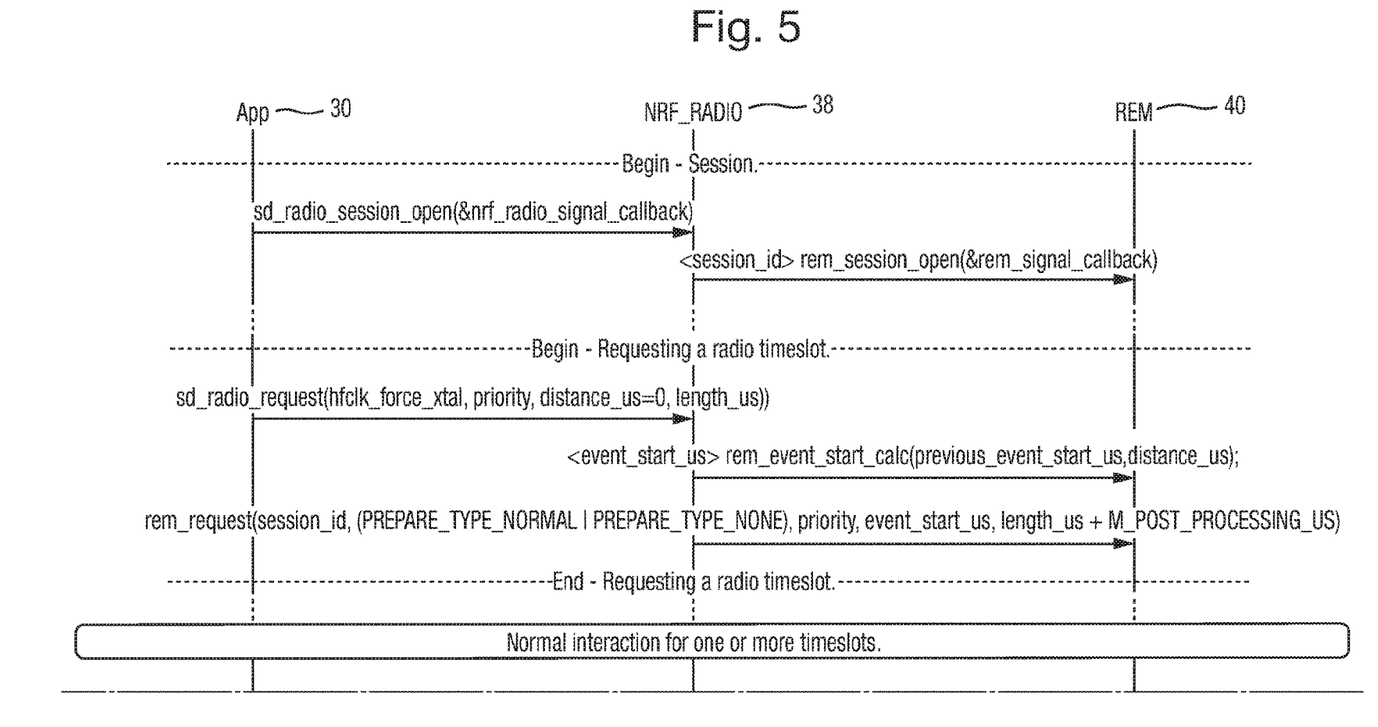
FIG. 5 is a timing diagram illustrating a further operation of the embodiment.

FIG. 5 shows a variation of the operation which is described with reference to FIG. 4. In fact, the operation shown in FIG. 5 is identical to that in FIG. 4 except that the signal 46.6 from the REM 40 to the API 38 indicates that the radio timeslot which was previously granted has been cancelled. This reflects the fact that timeslots are requested for a time in the future and even if granted can be cancelled if a conflicting request with a higher priority for the same timeslot is received before the timeslot has started.

It will be appreciated that the operation has been described with reference to the application 30, which implements the second protocol stack 32, although exactly the same procedure applies for the first protocol stack 20 which is supplied pre-installed on the device. It may be thus appreciated that the API 38 and REM 40 between them allow a simple mechanism for granting access to the radio resources to either protocol based on a system of requests which have a specific priority level. This means that the radio resources can be shared without either protocol needing to have any knowledge of the operation of the other. The priority levels available to the respective protocols can be configured so that the protocols can function with critical transmission and reception taking place but with less critical events potentially having to wait, in an ordered manner, whilst more critical events from the other protocol are processed. Typically, the range of priority levels given to the user-implemented protocol stack 32 will not include the very highest priority levels which are only available to the pre-installed standard protocol stack 20. This ensures for example that a user-implemented protocol cannot unduly compromise the operation of a certified standard protocol.

The invention claimed is:

1. A semiconductor device comprising a radio transmitter hardware section and a processor, the device being arranged to transmit information via said transmitter hardware section from a first application running on the processor in accordance with a first communication protocol or from a second application using a second communication protocol running on the processor or a further processor,
   wherein the first application is configured to generate a first transmit request when it requires to send a data packet and wherein the second application is configured to generate a second transmit request when the second application requires to send a data packet,
   the device further comprising control logic for allocating a transmission timeslot for said transmitter section to said first or second application upon receipt of said first or second transmit requests respectively,
   wherein the first application has at least some higher priority levels available to it than the second application, the device further comprising an application programming interface which permits a user to define the second protocol; and wherein the first protocol is implemented by a pre-compiled protocol.

2. The semiconductor device as claimed in claim 1 wherein said first transmit request comprises a first protocol priority level indicator, said second transmit request, comprises a second protocol priority level indicator and the control logic is arranged in the event of receiving conflicting first and second transmit requests to allocate said transmission timeslot based on said first and second protocol priority level indicators.

3. The semiconductor device as claimed in claim 2 wherein the control logic is arranged to issue a signal to the application which issued the request with the lower level priority indicator that the request has been denied.

4. The semiconductor device as claimed in claim 1 comprising a memory having a firmware module stored at a firmware memory address, the firmware module comprising instructions forming part of the first application, wherein the processor is configured to receive supervisor call instructions, each having an associated supervisor call number, and to respond to a supervisor call instruction by (i) invoking a supervisor call handler in the firmware module, and (ii) making the supervisor call number available to the call handler.

5. The semiconductor device as claimed in claim 4 wherein the first application is loaded into said memory such that the first application is stored at a predetermined application memory address.

6. The semiconductor device as claimed in claim 4 wherein the first application is arranged to invoke a radio communication function from the firmware module by issuing a supervisor call instruction having an associated predetermined supervisor call number corresponding to the function to be invoked.

7. The semiconductor device as claimed in claim 1 wherein the first and/or second request further comprises a session identification field.

8. The semiconductor device as claimed in claim 1 wherein the first and/or second applications are arranged to receive timing information from the control logic.

9. A semiconductor device comprising a radio receiver hardware section and a processor, the device being arranged to receive information via said receiver hardware section to a first application running on the processor in accordance with a first communication protocol or to a second application using a second communication protocol running on the processor or a further processor,
  wherein the first application is configured to generate a first receive request when it requires to receive a data packet and wherein the second application is configured to generate a second receive request when the second application requires to receive a data packet,
  the device further comprising control logic for allocating a reception timeslot for said receiver section to said first or second application upon receipt of said first or second receive requests respectively,
  wherein the first application has at least some higher priority levels available to it than the second application, the control logic being arranged in the event of receiving conflicting first and second receive requests to allocate said reception timeslot based on said first and second protocol priority level indicators,
  wherein the first protocol is implemented by a pre-compiled protocol and wherein the second protocol is user-defined.

10. A semiconductor device as claimed in claim 9 wherein said first receive request comprises a first protocol priority level indicator, said second receive request comprises a second protocol priority level indicator and the control logic is arranged in the event of receiving conflicting first and second receive requests to allocate said reception timeslot based on said first and second protocol priority level indicators.

11. The semiconductor device as claimed in claim 10 wherein the control logic is arranged to issue a signal to the application which issued the request with the lower level priority indicator that the request has been denied.

12. The semiconductor device as claimed in claim 9 comprising a memory having a firmware module stored at a firmware memory address, the firmware module comprising instructions forming part of the first application, wherein the processor is configured to receive supervisor call instructions, each having an associated supervisor call number, and to respond to a supervisor call instruction by (i) invoking a supervisor call handler in the firmware module, and (ii) making the supervisor call number available to the call handler.

13. The semiconductor device as claimed in claim 12 wherein the first application is loaded into said memory such that the first application is stored at a predetermined application memory address.

14. The semiconductor device as claimed in claim 12 wherein the first application is arranged to invoke a radio communication function from the firmware module by issuing a supervisor call instruction having an associated predetermined supervisor call number corresponding to the function to be invoked.

15. The semiconductor device as claimed in claim 9 wherein the first and/or second request further comprises a session identification field.

16. The semiconductor device as claimed in claim 9 wherein the first and/or second applications are arranged to receive timing information from the control logic.

* * * * *